(12) United States Patent
Olds et al.

(10) Patent No.: US 6,641,041 B2
(45) Date of Patent: Nov. 4, 2003

(54) VEHICLE TIRE ILLUMINATION SYSTEM

(76) Inventors: Roger Olds, P.O. Box 3033, West Chester, PA (US) 19381; Marquis Burnett, 2349 Bellview, #C, Topeka, KS (US) 66606

( * ) Notice: Subject to any disclaimer, the term of this patent is extended or adjusted under 35 U.S.C. 154(b) by 0 days.

(21) Appl. No.: 10/234,877

(22) Filed: Sep. 4, 2002

(65) Prior Publication Data

US 2003/0042310 A1 Mar. 6, 2003

Related U.S. Application Data

(60) Provisional application No. 60/356,075, filed on Feb. 11, 2002, and provisional application No. 60/317,068, filed on Sep. 4, 2001.

(51) Int. Cl.$^7$ ................................................. G06K 7/10
(52) U.S. Cl. ........................ 235/454; 340/468; 359/524
(58) Field of Search ................................. 235/454, 474; 340/468, 463, 425.5; 356/23, 24, 25; 359/462, 514, 524; 152/523, 524; 362/500

(56) References Cited

U.S. PATENT DOCUMENTS

| | | | | |
|---|---|---|---|---|
| 3,449,201 A | * | 6/1969 | Palmquist et al. | 428/325 |
| 4,289,376 A | | 9/1981 | Vukadinovic | 359/524 |
| 4,318,436 A | | 3/1982 | Shurman | 152/423 |
| 4,655,546 A | * | 4/1987 | Nagasaka et al. | 359/524 |
| 5,548,274 A | | 8/1996 | Anderson et al. | 340/468 |

* cited by examiner

*Primary Examiner*—Diane I. Lee
(74) *Attorney, Agent, or Firm*—Connolly Bove Lodge & Hutz LLP

(57) ABSTRACT

An illumination system periodically directs a short burst of bright light onto rotating indicia which makes the indicia appear to be stationary. The exact location of the indicia on the sidewall of the vehicle tire is determined by an emitter and sensor during each revolution of the tire, and a short burst of bright light is then directed onto the indicia which makes the indicia appear to be stationary and therefore discernable. Repeating design features of a vehicle wheel may also be sensed with an accompanying short burst of bright light which makes the wheel appear to be stationary.

15 Claims, 3 Drawing Sheets

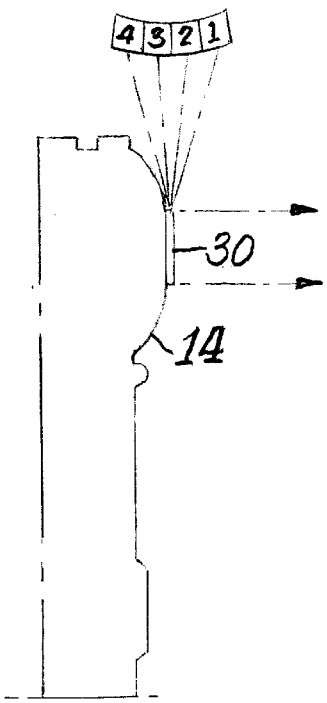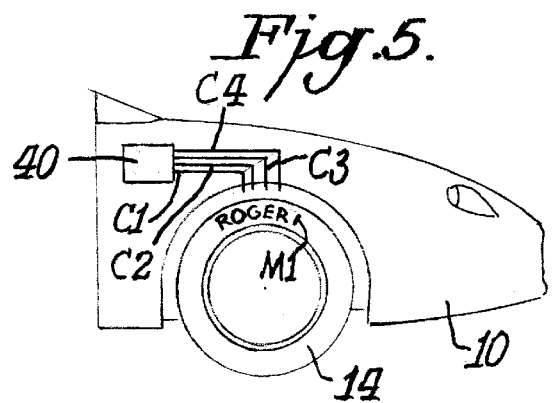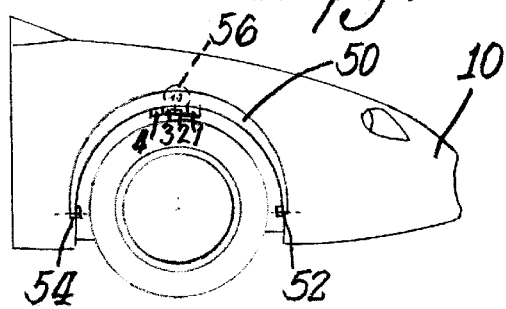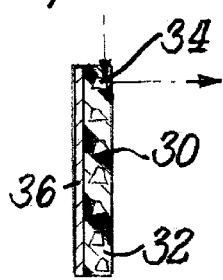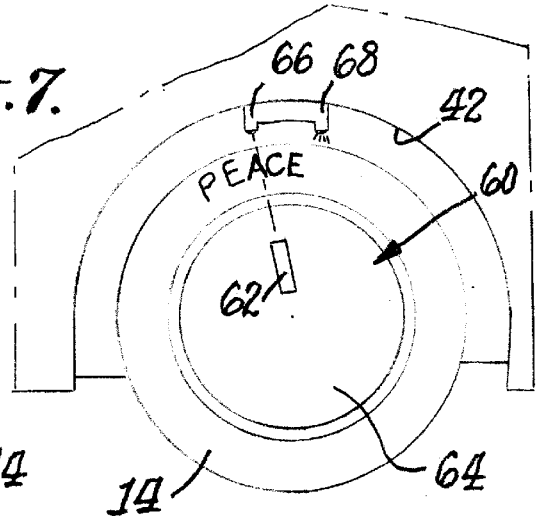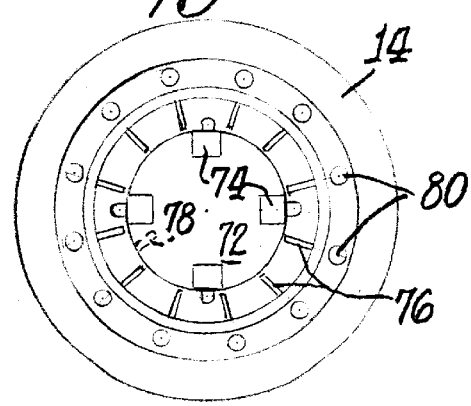

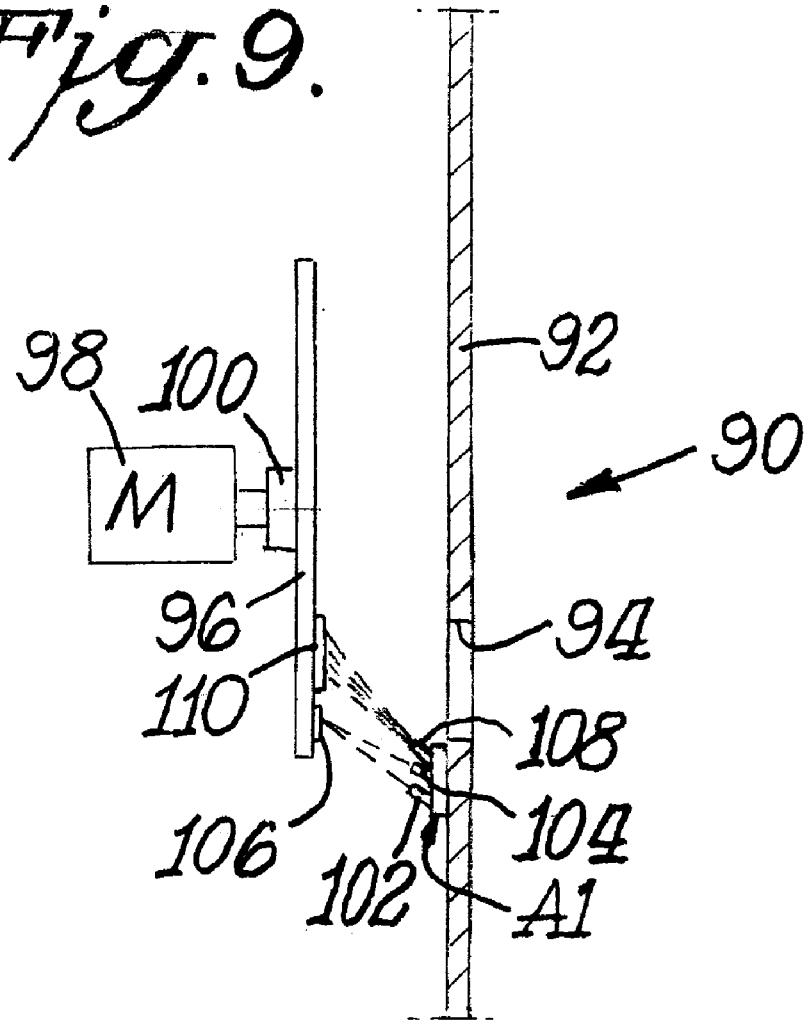

VEHICLE TIRE ILLUMINATION SYSTEM

REFERENCE TO RELATED APPLICATIONS

The present application claims the benefit of applications Serial Nos. 60/317,068, filed Sep. 4, 2001, and 60/356,075, filed Feb. 11, 2002, and these applications are incorporated herein by reference for any and all useful purposes.

BACKGROUND OF THE INVENTION

This present invention relates to a logic-controlled light with an emitter and sensor which identify and shine a burst of light or radiation onto a rapidly moving or rotating or vibrating or repeating element, and an illuminating system containing the logic-controlled light. The lighting system illuminates tire and/or wheel areas of a vehicle. In particular, the illuminating system may be used to make the tire and/or wheel area selectively appear to be stopped as they rotate when driving the vehicle. Customized information on the side of the tire can be communicated in a predetermined manner as the tire rotates.

The use of vehicles for displaying messages and advertising products for sale has existed for some time. The large number of vehicles and their exposure to the public provide an excellent source for such messages and advertising. The message can be displayed in any convenient location on the vehicle such as bumpers and the like. Persons have the option of purchasing a variety of messages printed on a plastic sheet with an adhesive back to attach the sheet to bumpers. Signs are also available with magnets to temporarily attach the sign to a side door of the vehicle. Stickers on the windows of vehicles are also used to provide identification and to display various types of information. Essentially every convenient vehicle location is used in some way for written information as well as for graphical displays. Signs may also be added to the top of the vehicle which are illuminated to display a message on the sign, particularly at night.

Some locations are more convenient than others depending on the type of information and the movement of the vehicle. For example, the side of a tire is used for messages for the slow moving or stationary vehicle. Normally tires have a black tread and sidewall and many tires have white letters displayed on their sidewalls to advertise the tire manufacturer. The demand for raised white letters on the sidewall of the tire has become greater as owners have become more interested in making a statement by displaying information on the side of their tires. In U.S. Pat. No. 4,318,436 molded rubber articles are disclosed for use on tire sidewalls to provide a combination of decorative, multi-colored, personalized, safety-enhancing and utilitarian type information. The rubber articles provide limitless styling for the vehicle which is stopped or near stopped. However, this location is not desirable for the traveling vehicle due to high speed tire rotation.

The sidewall of a tire can be used to display written and graphical indicia if the tire can be made to appear stationary while the vehicle is moving. Stroboscopic instruments are common in the industry for making moving bodies intermittently visible by illuminating a part of the body with bright flashes of light. Short flashes of very bright light can make a portion of an object appear stationary, if the frequency of the flashes is synchronized to the movement of the object. However, stroboscopes in the industry are normally used for inspections of rotating machinery and are usually hand carried or tripod mounted. Stroboscopes in the art are not designed for displaying information on the side of a rotating tire or making a wheel assembly appear stationary or animated.

In today's society the purchase of an automobile is often the second largest purchase made during an individual's lifetime. As such, the automobile is the outward manifestation of most individual's self-esteem, social progress and identity. Most late model automobiles have some label, vanity tag, emblem, detailing, or signature to make the mass-produced vehicle unique.

General lighting of vehicles and the area around a vehicle for aesthetic effects, and to attract the attention of others to an operator's vehicle, has become something that has considerable economic value in the industry. People like to show off their vehicles.

Reflection of light from an automobile tire is disclosed in U.S. Pat. No. 4,289,376. This patent discloses using an adjustable light reflector attached to the valve of the tire. The light protrudes just outside the outermost edge of the tire's sidewall so as to reflect light once each rotation of the wheel creating a flickering effect. The reflector is illuminated by the lights of other vehicles and information is not displayed on the reflector.

Also, U.S. Pat. No. 5,548,274 discloses a stroboscopic device for displaying indicia, including written and graphical information, on the side of a tire as the vehicle is moving. In particular, the indicia is made to appear stationary as the tire rotates by illuminating the tire with bright flashes of light.

SUMMARY OF THE INVENTION

The tires of the automobile often carry labels and identifying marks, but these marks promote the tire companies and their products, not the individual. The system of the present invention allows the individual to place the individual's mark, name, slogan, etc. on the exterior of a tire by application of pliable or non-pliable materials, paint, or surface preparation that can be seen by individuals in close proximity to the tire. Further, this system allows for better viewing of any mark, name, slogan or drawing on the tire and the design of the wheel, especially when the tire and automobile are in motion. The system in one form comprises a series of rubber letters/numbers applied to the exterior perimeter of the tire using rubber adhesive and/or heat. A light and sensor are positioned in each wheel well of the automobile and collectively they function to locate and fire whenever the letters/numbers are positioned on the top of the tire sidewall or any other desired location on the tire. This process not only illuminates the letters/numbers, but it also may stop the wheel so that the name and the beauty of the wheel and tire are clearly visible constantly while the automobile is moving down the street at normal speeds.

Among the other objects and features of the present invention is the application of letters, numbers, symbols and/or pictures fashioned out of rubber sheet-stock to the exterior of tire sidewalls and white sidewalls using rubber adhesive and/or other suitable chemicals with or without the presence of heat and pressure. The indicia applied to the tires may be folded, crimped or rolled letters, number, symbols, and/or pictures fashioned out of rubber sheet-stock or other suitable elastomeric or plastic material so that the letters, numbers, symbols, and/or pictures are not readily visible until the tires/wheels obtain sufficient revolutions per minute to unfold, uncrimp and/or unroll the letters, numbers, symbols, and/or pictures for illumination and viewing by natural light, electric illumination, or strobe light(s).

The invention also includes the processing of the automobile tire sidewall to expose the white rubber underlayer in the form of letters, numbers, symbols, and/or pictures for viewing and/or illumination by natural light, artificial (electric) illumination, or strobe light. Also, paint, solvent, and/or adhesive material and non-pliable materials may be applied to the automobile tire sidewall to form letters, numbers, symbols and/or pictures for viewing in natural light, artificial (electric) light, and/or strobe lights.

Illumination of an image on a stationary or rotating tire may include using a laser, bright light, or reflected light or neon light.

A series of hollow letters, numbers, symbols and/or pictures may be used that fill with a contrasting liquid or semi-solid, or colloidal suspension when the forces from the rotating tire force the mobile phase into the hollow space(s) from a reservoir.

A flashing light assembly that is self-contained and provides a bright light to illuminate the tire and wheel assembly may be utilized. Such self-contained assembly may include a battery for energizing the individual components. This causes the tire and wheel assembly to remain stationary to the viewer when the automobile is traveling at a normal speed as well as when the automobile is stationary.

The flashing light assembly may contain a sensor and may be self-contained. When reflected light or directed light or radiation hits the sensor, the self contained unit energizes a bright light to illuminate the tire and wheel assembly. This causes the tire and wheel assembly to remain stationary to the viewer when the automobile is traveling at all normal speeds and the tire/wheel assembly is in a specific or several specific orientations as determined by the sensor.

Moreover, flashing light assembly may be energized by the automobile battery for operation.

The flashing light assembly may contain a computer or logic circuit that provides control to eliminate illumination when the automobile is moving too slowly or stationary or causes variable and differing illumination of the tire/wheel assembly as determined by the driver.

A flashing light assembly of one or more lights may operate from a central location in the automobile to convey pulse light(s) to the four tire wells, tires and wheels. A series of glass fiber optic cables, plastic fiber optic cables and combination of glass and plastic fiber optic cables and a series of reflectors and/or magnifiers and/or fiber optic union boxes sense the orientation of each tire and emit and convey bursts of light.

The flashing light or LED assembly may also be triggered to emit light by non-optical determination of the orientation of the tire/wheel assembly.

An intense light may perform through the use of deflectors or blinders that cause bursts of illumination to the tires and wheel assemblies and wheel wells similar in magnitude, duration and frequency to a strobe light or neon tube assembly.

A radiation source and radiation acceptor for the source may be located in a wheel well and on the tire/wheel assembly, respectively or vice verse respectively so that an identifying series of letters, numbers, symbols, and/or pictures can be viewed.

The light source may be any visible or invisible radiating energy.

A mechanical device may be utilized to cause the irradiation device to be hidden or almost hidden from sight when not operational, but then cause the radiation emitting source to radiate the side wall of the tire and/or the wheel assembly effectively and efficiently. A prismatic device may also be used for this purpose.

In an alternative embodiment an electrically driven illumination system may be used that switches off and on when a contact correlated to wheel rotation switches off and on. Still another embodiment may include an electric sign attached to the tire/wheel that turns on and off with intermittent current during tire/wheel rotation Moreover, a tire valve stem system may double as a flashing light source to illuminate all or a portion of the tire or wheel assembly at specific times and orientations of the tire and/or wheel assembly. The tire valve system may also double as a sensor for controlling intermittent light to illuminate the tire and/or wheel assembly.

The light system's micro computer and sensors may read varying and different marks and stops, various words, letters numbers, symbols, pictures, etc. in a specified or variable sequence for a variable length of time.

Adhering letters may be cut out of 2 ply bicycle tire patch material (2 ply rubber) and applied to the tire sidewall with rubber adhesive with or without heat. The letters/numbers/symbols may illuminate on their faces when irradiated with light or energy onto their edges. Moreover, the letters/numbers/symbols may be arranged in a circular pattern in reverse on clear release paper/plastic to facilitate uniform spacing and orientation on a circular tire during application.

Moreover, a hubcap or wheel covering or wheel assembly may contain a bright light or strobe that is actuated externally or has an internal switch that causes it to light precisely on every revolution or fraction of a revolution equal to one (1) divided by the number of repeating units of the wheel or hubcap of the wheel, hubcap, wheelcover or other like device to render the appearance of the hubcap, wheelcover or device stationary to a passing observer.

The same apparatus may cause the wheelcover or hubcap to appear to be moving in slow motion or animated when viewed externally.

A wheel with an enclosed light may also function in this manner. Also, a reflection device may function when irradiated as the enclosed light. Also, a mechanical device may cause an enclosed light to appear and irradiate a wheel and/or tire and then retract when the wheel is not in motion.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar reference characters refer to similar parts and in which:

FIG. 3 is a diagrammatic view of a tire and wheel illustrating predetermined periodic illumination of indicia on the tire utilizing the illumination system of FIGS. 1 and 2;

FIG. 4 is an enlarged sectional view of the indicia on the tire shown in FIG. 3;

FIG. 5 is a diagrammatic view of an alternate embodiment of the present invention wherein the illumination system includes fiber optic cables, according to the present invention;

FIG. 6 is a diagrammatic view of an another embodiment of the present invention which enables portions of the illumination system to be located outside of the vehicle tire when illumination occurs, according to the present invention;

FIG. 7 is a diagrammatic view of an another vehicle tire illuminating system, according to the present invention;

FIG. 8 is a diagrammatic side elevational view of a vehicle tire and still another alternate embodiment of the illuminating system, according to the present invention; and FIG. 9 is a diagrammatic view of a display with an illumination system, according to the present invention;

DETAILED DESCRIPTION OF THE INVENTION

Figure 1:
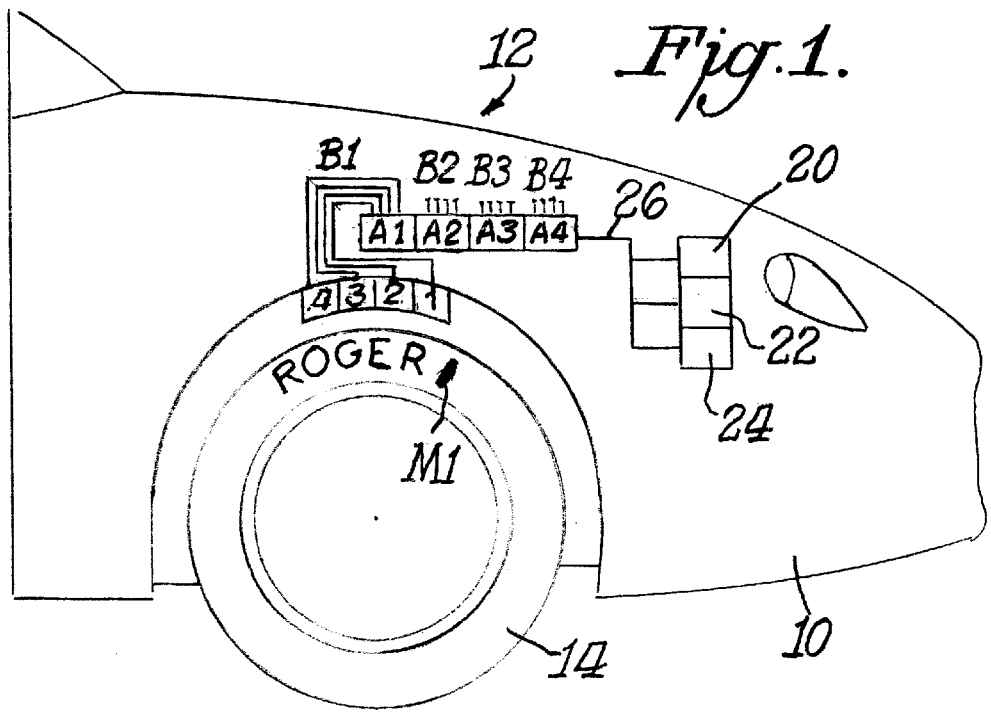
FIG. 1 is a diagrammatic side elevational view of an automobile with a vehicle illumination system, according to the present invention.

Referring in more particularity to the drawings, FIG. 1 shows the front end of an automobile 10 including a vehicle tire illumination system 12, according to the present invention. A microchip logic unit A1 is provided for the vehicle tire 14 illustrated in FIG. 1, it being understood that identical microchip logic units A2, A3 and A4 are also provided, one for each of the other vehicle tires (not shown). Each microchip logic unit includes a circuit board 16 and a hardware base 18. Basically the hardware base includes four components identified in the drawings as 1, 2, 3 and 4, and explained in more detail below. Lines B1, B2, B3 and B4 interconnect units A1, A2, A3 and A4 to the component 1, 2, 3 and 4 associated with each wheel.

Power is supplied to each of the microchip logic units A1, A2, A3 and A4 from a condenser coil 20, power source 22 and backup battery 24. Conducting lines 26 are provided between these components.

Indicia such as the name "Roger" may be applied to the sidewall of the tire 14 by a variety of procedures such as the application of rubberized letters, paint, abrasion of the tire to reveal a white under layment, etc. Additionally, a code in the form of mirror strip M1 or other indicator is appropriately positioned on the sidewall of the tire adjacent the indicia.

The hardware of each microchip logic unit includes an infrared or other form of emitter 4 that projects a beam onto the sidewall of the tire 14 or the tread thereof. An infrared or other type sensor or detector is positioned to receive any light from the emitter 4 which is reflected from the sidewall of the tire. Also included in the microchip logic unit is a light or strobe or LED flashing unit 2 and an optical motion detector 1. Motion detector 1 merely senses the present of motion in the field of view of the vehicle tires. If motion is detected and the system is operating the system remains operational. On the other hand, if no motion is detected, the system is shut down.

When the vehicle tire illumination system 12 is energized and the automobile 10 is traveling along a roadway, a beam from emitter 4 is reflected by the sensor strip M1 onto detector 3 each time the sensor strip is in the path of the emitter. When this occurs the microchip logic unit A1 energizes the flashing unit 3 within less than ½ second illuminates the indicia "Roger" on the sidewall of the tire 14 for a duration less than ½ second. This causes the indicia to appear stationary which may then be observed by persons in the field of view of the traveling automobile 10. Each revolution of tire 14 produces a similar burst of bright light from the flashing unit 2 to thereby create the illusion of a stationary tire sidewall in the area of the indicia. As such, the indicia of the sidewall of the tire is easily discernable. The flashing unit 2 may be covered with different color lenses to thereby project colored light onto the sidewall of the tire.

Normally in the close quarters of an automobile wheel well, the hardware 1, 2, 3 and 4 is positioned to project the emitter beam and a burst of bright light from almost directly above the side wall of the tire 14. Under such circumstances indicia 30, such as shown in FIGS. 3 and 4 may be fabricated to comprise a matrix of transparent thermoplastic material 32 with trapezoidal-shaped cube-like reflective particles 34 embedded therein. These particles function to reflect the flashing light outwardly of the automobile tire as well as upwardly toward the sensor 3. The transparent matrix 32 with the reflective particles 34 may be secured to a suitable backer 36 which is applied to the sidewall of the tire 14.

FIG. 5 illustrates an alternate embodiment of the present invention where the microchip logic unit and the associated hardware are packaged within a system 40 located under the body of automobile 10. In system 40, fiber optic cables C1, C2, C3 and C4 are positioned in the wheel well 42 of the vehicle for projection onto the sidewall of tire 14. Fiber optic cable C1 emits infrared light onto the sidewall which is reflected back to fiber optic cable C2 by the mirror strip M1. When this occurs a burst of bright light from fiber optic cable C3 is directed onto the sidewall of the tire to illuminate the indicia "Roger". A burst of such light occurs each revolution of tire 14 which makes the indicia appear to be stationary.

Figure 2:
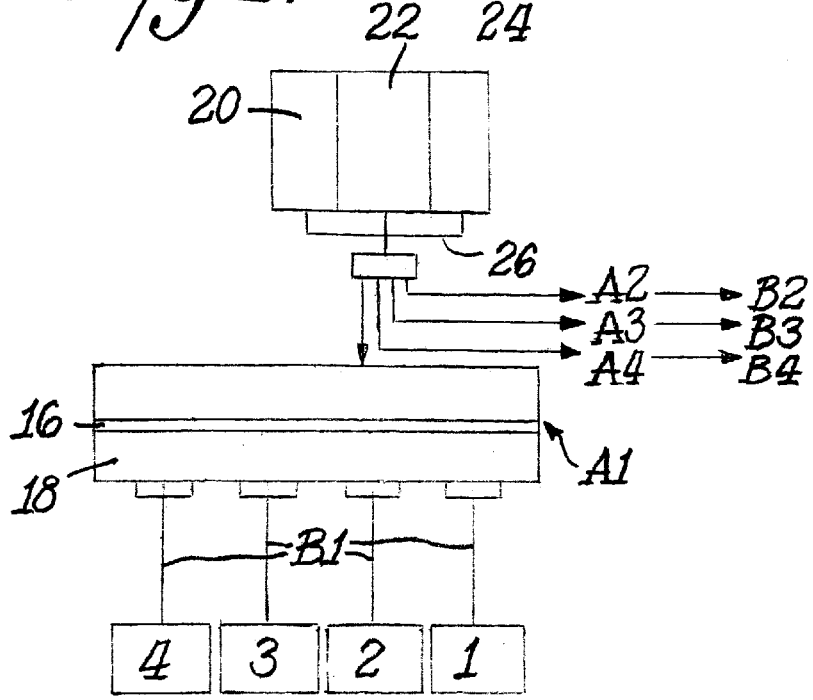
FIG. 2 is a diagrammatic view of portions of the illumination system shown in FIG. 1.

FIG. 6 shows features of the present invention wherein the hardware 1, 2, 3 and 4 is positioned on a swing frame 50 pivoted to the automobile 10 by pivot pins 52, 54. Otherwise the system of FIG. 6 is the same as shown in FIGS. 1 and 2. Accordingly, when the system of FIG. 6 is energized a motivator, such as a piston and cylinder 56, function to swing frame 50 in an outward direction about the pivot pins 52, 54. This positions the flashing light unit outwardly of the sidewall of the tire so as to more effectively illuminate the indicia thereon.

FIG. 7 illustrates still another embodiment of the present invention comprising a vehicle tire illumination system 60 that includes an emitter 62 on the wheel 64 of tire 14 that rotates with the wheel. A sensor 66 is positioned in the wheel well 42 of the automobile in the path of any directed light or radiation from emitter 62. During each revolution of the tire the beam from the emitter 62 is directed and received at sensor 66 which then sends a signal to flashing unit 64 to produce a burst of bright light onto the indicia "Peace" on the sidewall of the tire. The indicia is illuminated once for each revolution of the tire thereby producing the effect of the indicia appearing to be stationary.

FIG. 8 illustrates still another vehicle tire illumination system 70 wherein the vehicle wheel includes a stationary hubcap 72 with a plurality of flashing units 74 mounted on the periphery of the hubcap 72. The hubcap can be weighted with suitable connection to the tire wheel so that it does not rotate with the tire wheel. A plurality of sensor switch triggers 76 are positioned on the wheel in a circular array around the stationary hubcap to correspond to each repeating unit of the wheel. Contact arm 78 is positioned inside the hubcap 72 to engage and thereby sense each sensor switch trigger 76 as these triggers rotate past the arm. When such contact occurs each of the flashing units 74 is energized to thereby create a burst of bright light that illuminates the sidewall of the tire and/or wheel. In the embodiment shown in FIG. 8, the wheel includes 12 circular openings 80 and a trigger is associated with each opening. Accordingly, when the contact arm 78 engages a sensor switch trigger 76, each flashing unit 74 creates a burst of light which thereby produces the effect of the wheel with the openings 80 therein appearing to be stationary. Also, the opposite can occur, i.e. the hubcap rotates with the wheel and sensor switch triggers and the isolated contact arm is weighted, contains bearings and remains stationary in relation to the hubcap.

FIG. 9 illustrates a display 90 in the form of a billboard or sign including a stationary wall 92 and an open viewing window 94. The display includes a rotation disc 96 directly behind the stationary wall 92. Disc 96 is connected to a motor 98 by a mounting 100. A microchip logic unit such as A1 positioned behind the stationary wall 92 includes an emitter 102 and a sensor/receiver 104 which detects the presence of light reflected from the disc. In this regard, the disc has a mirror strip 106 thereon which reflects light from the emitter 102 when the mirror strip is within the path of the emitter beam. Upon sensing the reflected emitter beam, the sensor/receiver signals the microchip logic unit A1 to send a burst of bright light of short duration from flashing unit 108 onto the rotating disc, and more particularly onto indicia 110 on the disc thereby displaying the indicia through the window 94. Other areas of indicia (not shown) may be positioned on the disc for rapid display through the viewing window 94. The duration of the burst of light from flashing unit 108 lasts as long as the indicia is within view through the window 94. Indicia may be arranged on the disc 96 so that a multiword slogan or phrase or an animated sequence appears at the viewing window.

Further the disc may be mostly open space in the form of fan blades such that one can see through the hole unless A1 is activated in which case the billboard hole or an observation hole is opaque with the illuminated fan blade.

Moreover, the motor may be replaced by a vibrator and the disc replaced by a pie-shaped piece directly behind the viewing window. As the pie-shaped piece vibrates, indicia thereon is periodically sensed and illuminated.

We claim:

1. An illumination system for periodically directing a short burst of bright light and/or radiation onto rotating indicia, the system including an emitter and a sensor for detecting the presence and exact location of rotating indicia, and at least one light flashing unit for directing a short burst of bright light and/or radiation onto rotating indicia when the presence thereof is detected by the emitter and sensor.

2. An illumination system as in claim 1 in combination with a vehicle tire with indicia on sidewall portions of the tire.

3. An illumination system as in claim 2 including a control, a first fiber optic cable directing a beam from the emitter onto the automobile tire, a code on the tire adjacent the indicia for reflecting the emitter beam to the sensor when the code is in the path of the emitter beam, a second fiber optic cable connecting the sensor to the control, a third fiber optic cable connected to the light flashing unit for directing the short burst of bright light onto the indicia when the sensor signals the control of the presence of the code and adjacent indicia.

4. An illumination system as in claim 3 wherein the code comprises at least one mirror strip.

5. An illumination system as in claim 2 including a code on the sidewall portions of the tire adjacent the indicia, and wherein the code reflects light from the emitter to the sensor to signal the presence of the indicia whereupon the light flashing unit directs a short burst of bright light to illuminate the indicia.

6. An illumination system as in claim 5 wherein the code comprises at least one mirror strip.

7. An illumination system as in claim 2 including a swing frame for the emitter, sensor and light flashing unit, the swing frame being constructed and arranged to move between an inoperational position above the vehicle tire and an operational position outwardly of the vehicle tire.

8. An illumination system as in claim 2 wherein the emitter is connected to rotate with the vehicle tire, and the sensor and light flashing unit are stationary adjacent the tire.

9. An illumination system as in claim 2 including a hubcap or wheel assembly associated with the vehicle tire constructed and arranged to remain stationary as the tire rotates, and wherein the flasher unit and sensor are secured to the hubcap or wheel assembly while the emitter rotates with the tire.

10. An illumination system as in claim 2 wherein the light flashing unit includes a colored lens.

11. An illumination system as in claim 2 wherein the indicia contains particles in the surface thereof that reflect light at small angles and/or edges.

12. An illumination system as in claim 1 in combination with a stationary billboard having an opening therein, and rotating indicia behind the billboard viewable through the opening.

13. An illumination system for periodically directing a short burst of bright light or radiation onto a wheel assembly, the system including a plurality of spaced apart sensor switch triggers positioned on the wheel assembly in a circular array, a stationary contact arm constructed and arranged to sense each sensor switch trigger as the triggers rotate past the arm, and at least one flashing unit for directing a short burst of bright light or radiation onto the wheel assembly each time the contact arm senses a switch trigger.

14. An assembly comprising an emitter for directing a beam onto rapidly moving indicia and a code therefor, a sensor for sensing the emitter beam when the beam hits the code, and a device selected from the group consisting of a strobe light, LED and radiation source for periodically illuminating the indicia when the emitter beams is sensed by the sensor, and wherein each illumination of the indicia is less than ½ second and the duration between the emitter beam being sensed and each illumination is less than ½ second.

15. An assembly as in claim 14 wherein the code comprises at least one mirror strip.

* * * * *